United States Patent [19]

St. Angelo et al.

[11] Patent Number: 4,871,556
[45] Date of Patent: Oct. 3, 1989

[54] INHIBITION OF WARMED-OVER FLAVOR AND PRESERVING OF UNCURED MEAT CONTAINING MATERIALS

[75] Inventors: Allen J. St. Angelo, Metairie; John R. Vercellotti, Covington, both of La.

[73] Assignee: The United States of America as represented by the Secretary of Agriculture, Washington, D.C.

[21] Appl. No.: 207,588

[22] Filed: Jun. 16, 1988

[51] Int. Cl.$^4$ ............................................... A23B 4/14
[52] U.S. Cl. ...................... 426/92; 426/129; 426/140; 426/332; 426/641
[58] Field of Search .................. 426/641, 332, 129, 92, 426/541, 140

[56] References Cited

U.S. PATENT DOCUMENTS

| | | | |
|---|---|---|---|
| 3,567,467 | 3/1971 | Cohly | 426/140 |
| 3,810,998 | 5/1974 | Sato et al. | 426/332 |
| 3,821,444 | 6/1974 | Sato et al. | 426/332 |
| 3,904,772 | 9/1975 | Moegle | 426/92 |
| 3,917,855 | 11/1975 | Burke | 426/92 |
| 3,939,288 | 2/1976 | Sato et al. | 426/332 |
| 3,962,472 | 6/1976 | Torres | 426/332 |
| 4,016,292 | 4/1977 | Hood | 426/332 |

FOREIGN PATENT DOCUMENTS 118784 9/1984 European Pat. Off. .

OTHER PUBLICATIONS

Lynch et al. Am. J. Clin. Nutr. 41(1) 1985 (Abstract only).
Gerrard 1969 Sausage and Small Goods Production, Leonard Hill Books, London, pp. 31-35, 65-69, 77-79, CA 80 (17) 94420p.
St. Angelo et al., Food Technology 42(6) 133-138.

Primary Examiner—Carolyn Paden
Attorney, Agent, or Firm—David R. Sadowski; M. Howard Silverstein

[57] ABSTRACT

When uncured meat is stored, even for a relatively short time after cooking, it develops what is commonly referred to as warmed-over flavor (WOF). The present invention is drawn to, inhibiting WOF, and preserving (e.g. extending the shelf life of), uncured meat containing materials i.e. UMCM (for example, uncured meat per se or materials (e.g. foods) which include uncured meat) by combining said UMCM with an additive composition selected from the group consisting of, desferoxamine mesylate (also referred to as Desferal ® mesylate or desferrioxamine), or N-carboxymethyl-chitosan.

17 Claims, No Drawings

INHIBITION OF WARMED-OVER FLAVOR AND PRESERVING OF UNCURED MEAT CONTAINING MATERIALS

BACKGROUND OF THE INVENTION (1) Field of the Invention

The instant invention relates to, inhibiting warmed-over flavor (WOF) in, and preserving (e.g. extending the shelf lift), uncured meat containing materials (UMCM) by combining said UMCM with additive compositions.

(2) Description of the Prior Art

Precooked meat containing materials (e.g. foods) have the potential to be a multi-billion dollar industry; however, this industry is limited in its sales because of: (1) the occurrence of warmed-over flavor i.e. WOF (which is a deterioration of desirable meaty flavor characteristics when uncured meat is stored after cooking); (2) a relatively short shelf-life for uncured meat containing materials. It is known to prevent the formation of WOF by curing meat with nitrites and nitrates; however, such curing may lead to problems with potentially carcinogenic properties. It is also known to mask WOF using flavor masking materials such as heavy gravies, sauces, spices or seasonings. However, such flavor masking additives may be undesirable to the consumer and thus decrease the desirability and saleability of the meat containing material.

SUMMARY OF THE INVENTION

The objects of the invention include: inhibiting warmed-over flavor in uncured meat containing materials and thereby eliminating the need for either flavor masking materials or curing; and preserving (e.g. extending the shelf-life of) uncured meat containing materials. Other objects and advantages of the present invention will become readily apparent from the ensuing description.

The present invention accomplishes the above objects by combining uncured meat containing material (UMCM), either before cooking (i.e. fresh or raw UMCM) or after cooking, with additive compositions selected from the group consisting of: deferoxamine mesylate (also referred to as N-[5[3[5-aminopentyl)hydroxycarbamoyl]propionamido]pentyl]-3-[[5-hydroxyacetamidopentyl] carbamoyl]propionohydroxamic acid monomethanesulfonate or Desferal ®mesylate or desferrioxamine) the chemical structure of which is

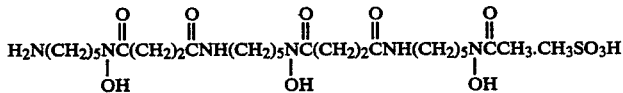

or; N-carboxymethyl-chitosan (methods of preparation of which are described by R. A. A. Muzzarelli in "Carboxymethylated Chitins and Chitosans" in Carbohydrate Polymers, 8 (1988) pages 1–21).

In the instant specification and claims the phrase "uncured meat containing material" (UMCM) is intended to encompass uncured meat, i.e. the uncured flesh of any animal wherein said flesh is not within the whole animal (e.g. beef, poultry, pork, fish, veal, lamb, or any flesh of any animal) per se, or any material including uncured meat e.g. uncured meat combined with seasonings, flavorings, extenders, other foods, etc..

If said combining of UMCM with additive is carried out with uncooked or raw (e.g. fresh) UMCM the combination may of course be consumed or cooled (as for example by refrigeration or freezing) to further promote preservation of the UMCM. Alternatively or additionally, the combination of additive and UMCM may be cooked i.e. partially cooked or fully cooked (as for example by applying heat or microwaves), and either consumed or cooled to further promote preservation of the UMCM until such time as it is desired to consume the UMCM, at which time the UMCM may be recooked or reheated or cooking of the UMCM may be completed. If said combining of UMCM and additive is carried out with cooked (i.e. partially cooked or fully cooked) UMCM the combination may be consumed, or the combination may be cooled to further promote preservation of the UMCM until such time as it is desired to consume the UMCM, at which time the UMCM may be recooked or reheated or cooking of the UMCM may be completed. The additives of the present invention serve to preserve and prevent WOF in the UMCM even with repeated cycles of cooking and cooling.

DETAILED DESCRIPTION OF THE INVENTION

The method of combining the additives of the present invention with the UMCM is not critical to the present invention, but may include for example: applying powdered additive to the UMCM as for example by dusting, injecting or spraying with the powdered additive, or dipping or rolling the UMCM in the powdered additive; applying a solution of the additive (e.g. in water or other suitable solvent) to the UMCM, as for example by, spraying onto the UMCM, injecting into the UMCM, dipping or rolling the UMCM in a solution of the additive; mixing ground or finely divided UMCM with additive or a solution containing additive (e.g. in preparation for forming a restructured meat containing product or burger or pattie); rubbing solid or dissolved additive onto and/or into the UMCM; incorporating the additive into, or placing the additive onto, a container or wrapper into which the UMCM is placed or contained, so that the additive from said container or wrapper is combined with the UMCM.

THe additives of the present invention will function to inhibit WOF and preserve UMCM over a wide range of temperatures, including for example: temperatures at which UMCM is frozen (e.g. minus 20° C.), typical refrigeration temperatures, room temperatures (e.g. 22° C.), typical baking temperatures (260° C.),etc. Thus the UMCM and additive may be combined at any of said wide range of temperatures, and the combined UMCM and additive may be frozen, refrigerated, stored at roomtemperature, cooked (e.g. either by applying heat or microwaves) or recooked.

The additives of the present invention may be utilized over a wide range of quantities and concentrations. The amount of additive combined with the UMCM may be readily determined depending upon the degree of preservation and WOF inhibition desired.

3

It is understood that the foregoing detailed description is given merely by way of illustration and that modifications and variations may be made without departing from the spirit and scope of the invention.

EXAMPLES

Freshly purchased top round was ground twice, distributed into 100 gram samples, then placed into 4 ounce jars and immediately stored at −20° C. until used. On the morning of the test, the jars of ground beef were thawed at room temperature, the contents placed into a boiling bag which was then placed into a pot of boiling water for 5½ minutes. After boiling, the gravy was discarded, and 10 gram beef samples were weighed into 2 ounce glass jars. A sample was frozen immediately for a standard. For a control, 2.0 milliliters of deionized water was added to a beef sample and then mixed vigorously with a spatula for 1 minute, capped, and stored at 4° C. for 2 days. This method produced beef described by a trained sensory panel as having WOF. The additives were mixed vigorously with 2 milliliters of either hot (95° C.) deionized water or 2 milliliters of deionized water at ambient temperature, and then added to the 10.0 gram samples of beef, with mixing in the same manner as the control. The effects of the additives were investigated by two different methods of analysis: (1) hexanal inhibition (i.e. the degree to which hexanal production by the beef was inhibited, as compared to hexanal production by the control sample) as measured by packed column direct gas chromatography by the method of Legendre M.G., Fisher, G. S., Schuller, W. H., Dupuy, H. P., and Rayner, E. T. 1979, "Novel technique for the analysis of volatiles in aqueous and nonaqueous systems" in the Journal fo the American Oil Chemists' Society Vol. 56, No.5 pages 552–555 and H. P. Dupuy, M. L. Brown, M. G. Legendre, J. I. Wadsworth, and E. T. Rayner, "Instrumental Analysis of Volatiles in Food Products" in American Chemical Society Symposium Series No. 75, *Lipids As a Source of Flavor*, Editor Michael Supran, 1978, American Chemical Society Washington, D.C>; (2) TBA (2-thiobarbituric acid) inhibition (i.e. the degree to which TBA production by the beef was inhibited, as compared to TBA production by the control sample) as measured by the method of B.G. Tarladgis et al, "Distillation Method for the quantitative determination of malondialdehyde in rancid foods" in J. Am. Oil chem. Soc., 37:44, 1960. These parameters were chosen owing to their high correlation coefficients, which indicated that the methods were effective in studying WOF in meat (St. Angelo, et al, "Chemical and Instrumental Analysis of Warmed-Over Flavor in Beef", J. Food Science, Vol. 52, No. 5 pages 1163–1168, 1987). The results were as follows:

TABLE 1

| ADDITIVE | Conc. in ppm[1] | TBA inhibition % (percent) | Hexanal inhibition % (percent) |
|---|---|---|---|
| None i.e. control | — | 0 | 0 |
| deferoxamine mesylate | 80 | 37.3 | 54.4 |
| deferoxamine mesylate | 200 | 64 | 100 |
| deferoxamine mesylate | 320 | 88.6 | 99.4 |
| deferoxamine mesylate | 520 | 88.9 | 99.5 |
| deferoxamine mesylate | 690 | 88.8 | 99.6 |
| N—Carboxymethyl chitosan | 670 | 43 | 57 |
| N—Carboxymethyl chitosan | 1,600 | 68 | 66 |
| N—Carboxymethyl chitosan | 5,000 | 93 | 99 |

[1](concentration of additive in parts per million of weight of additive divided by weight of meat (including the weight of water normally associated with the meat i.e. nondehydrated meat)).

The proceeding example is intended only to further illustrate the invention and is not intended to limit the scope of the invention as defined by the claims.

We claim:

1. A manufacture comprising, an uncured meat containing material combined with an amount of N-carboxymethyl-chitosan effective to inhibit warmed-over flavor.

2. The manufacture of claim 1 wherein said uncured meat containing material is an uncooked uncured meat containing material.

3. The manufacture of claim 1 wherein said uncured meat containing material is a cooked uncured meat containing material.

4. The manufacture of claim 1 wherein said uncured meat containing material comprises a meat selected from the group consisting of beef, poultry, pork, fish, veal or lamb.

5. The manufacture of claim 1 wherein, said uncured meat containing material combined with N-carboxymethyl-chitosan is inclosed within a container, and said container is comprised of said additive.

6. A process of treating uncured meat containing material comprising,
combining uncured meat containing material with an amount of N-carboxymethyl-chitosan effective to inhibit warmed-over flavor.

7. The process of claim 6 further comprising cooling the combined uncured meat containing material and N-carboxymethyl-chitosan subsequent to said combining.

8. The process of claim 6 wherein said combining is carried out with uncooked uncured meat containing material.

9. The process of claim 8 further comprising cooling the combined uncured meat containing material and N-carboxymethyl-chitosan subsequent to said combining.

10. The process of claim 8 further comprising cooking the combined uncured meat containing material and N-carboxymethyl-chitosan subsequent to said combining.

11. The process of claim 10 further comprising cooling the combined uncured meat containing material dn N-carboxymethyl-chitosan subsequent to said combining.

12. The process of claim 6 wherein said combining is carried out with cooked uncured meat containing material.

13. The process of claim 12 further comprising cooling the combined uncured meat containing material and N-carboxymethyl-chitosan subsequent to said combining.

14. The process of claim 6 wherein said combining is mixing, dusting, injecting, rubbing or spraying said uncured meat containing material with said N-carboxymethyl-chitosan.

15. The process of claim 6 wherein said combining is dipping or rolling said uncured meat containing material in said N-carboxymethyl-chitosan.

16. The process of claim 6 wherein said N-carboxymethyl-chitosan is in solution during said combining.

17. The process of claim 6 wherein said N-carboxymethyl-chitosan is a solid during said combining

* * * * *